United States Patent
Dunton et al.

(10) Patent No.: US 9,160,814 B2
(45) Date of Patent: Oct. 13, 2015

(54) INTUITIVE DATA TRANSFER BETWEEN CONNECTED DEVICES

(75) Inventors: Randy R. Dunton, Phoenix, AZ (US); William Romanowski, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 12/431,015

(22) Filed: Apr. 28, 2009

(65) Prior Publication Data

US 2010/0275135 A1 Oct. 28, 2010

(51) Int. Cl.
| | |
|---|---|
| G06F 3/048 | (2013.01) |
| H04L 29/08 | (2006.01) |
| G06F 3/0481 | (2013.01) |
| H04L 12/28 | (2006.01) |
| H04N 21/41 | (2011.01) |
| H04N 21/4147 | (2011.01) |
| H04N 21/4363 | (2011.01) |
| H04N 21/482 | (2011.01) |

(52) U.S. Cl.
CPC ............ *H04L 67/36* (2013.01); *G06F 3/04817* (2013.01); *H04L 12/282* (2013.01); *H04L 12/2838* (2013.01); *H04N 21/4126* (2013.01); *H04N 21/4147* (2013.01); *H04N 21/43632* (2013.01); *H04N 21/43637* (2013.01); *H04N 21/482* (2013.01)

(58) Field of Classification Search
CPC ................................................. H04N 21/43637
USPC .................... 715/753, 755, 758, 759; 709/204
See application file for complete search history.

(56) References Cited

U.S. PATENT DOCUMENTS

| | | | |
|---|---|---|---|
| 5,796,396 A | * | 8/1998 | Rich .............................. 715/741 |
| 6,243,452 B1 | | 6/2001 | O'Shaughnessey et al. |
| 7,509,131 B2 | | 3/2009 | Krumm et al. |

(Continued)

FOREIGN PATENT DOCUMENTS

| | | |
|---|---|---|
| CN | 2489516 Y | 5/2002 |
| CN | 101019090 A | 8/2007 |

(Continued)

OTHER PUBLICATIONS

Office Action mailed Aug. 19, 2010 from related foreign matter; serial No. 1007105.8, filed Apr. 28, 2010.

(Continued)

*Primary Examiner* — Anil Bhargava
(74) *Attorney, Agent, or Firm* — Green, Howard & Mughal, LLP

(57) ABSTRACT

Techniques for sharing or transferring content between connected devices via dynamic collaboration user interfaces. An embodiment involves creating a first collaboration user interface between a first device and a second device. Via the first collaboration user interface, selecting content to be made available to a third device, where the selected content is currently available to the first device and not currently available to the third device. A second collaboration user interface is created between the second device and the third device. State information may be provided to a user via at least one of the first collaboration user interface and the second collaboration user interface. The second collaboration user interface causes the selected content to be available to the third device. Other embodiments may be described and claimed.

17 Claims, 9 Drawing Sheets

(56) References Cited

U.S. PATENT DOCUMENTS

| | | | |
|---|---|---|---|
| 7,532,906 | B2 | 5/2009 | Enenkiel |
| 7,603,466 | B2 | 10/2009 | Kilian-Kehr et al. |
| 7,734,691 | B2 | 6/2010 | Creamer et al. |
| 2001/0044858 | A1* | 11/2001 | Rekimoto .................. 710/1 |
| 2003/0025738 | A1 | 2/2003 | Polgar et al. |
| 2003/0211856 | A1* | 11/2003 | Zilliacus ................ 455/466 |
| 2004/0153504 | A1* | 8/2004 | Hutchinson et al. ......... 709/204 |
| 2005/0009469 | A1* | 1/2005 | Kotola .................. 455/41.2 |
| 2005/0093868 | A1* | 5/2005 | Hinckley .................. 345/502 |
| 2005/0097478 | A1* | 5/2005 | Killian et al. ............. 715/851 |
| 2005/0188062 | A1 | 8/2005 | Li et al. |
| 2005/0246624 | A1* | 11/2005 | Humpleman et al. ..... 715/501.1 |
| 2005/0286857 | A1 | 12/2005 | Kallio |
| 2006/0053196 | A1* | 3/2006 | Spataro et al. ............. 709/205 |
| 2006/0075015 | A1 | 4/2006 | Wu et al. |
| 2006/0289657 | A1 | 12/2006 | Rosenberg |
| 2007/0296552 | A1* | 12/2007 | Huang et al. ............. 340/10.5 |
| 2008/0216125 | A1* | 9/2008 | Li et al. .................. 725/62 |
| 2009/0082051 | A1 | 3/2009 | Ruotsi |
| 2009/0177764 | A1 | 7/2009 | Blatherwick et al. |
| 2009/0193345 | A1 | 7/2009 | Wensley et al. |
| 2009/0292999 | A1* | 11/2009 | LaBine et al. ............. 715/740 |
| 2010/0121921 | A1 | 5/2010 | Dunton |
| 2014/0189513 | A1* | 7/2014 | Dua ...................... 715/716 |

FOREIGN PATENT DOCUMENTS

| | | |
|---|---|---|
| WO | 9749057 A3 | 12/1997 |
| WO | 2005043935 A3 | 5/2005 |

OTHER PUBLICATIONS

Office Action Received for GB Patent Application No. GB1007105.8, mailed on Jun. 13, 2011, 4 pages.

Office Action received for German Patent Application No. 102010018432.2-31, mailed on May 2, 2013, 10 pages of Office action including 4 pages of English Translation.

Office Action Received for Chinese Patent application No. 201010214300.1, mailed on Sep. 5, 2012, 7 pages of Office Action and 5 pages of English Translation.

* cited by examiner

INTUITIVE DATA TRANSFER BETWEEN CONNECTED DEVICES

CROSS-REFERENCE TO RELATED APPLICATIONS

THIS APPLICATION IS RELATED TO PENDING U.S. patent application Ser. No. 12/267,688, FILED ON Nov. 10, 2008, AND ENTITLED "PROXIMITY BASED USER INTERFACE COLLABORATION BETWEEN DEVICES," BY INVENTOR RANDY R. DUNTON.

BACKGROUND

A typical home of today has various connected media devices networked together in such a way to provide a user with a means for entertainment and interactive social experiences. Each of these connected media devices typically receives, processes and/or stores content. The sharing of content, for example, between the various connected devices is often necessary to provide the entertainment and/or interactive social experiences. Example devices may include personal computers (PCs), a universally connected display (UCD) which may be a connected audio/video (AV) device integrated in a digital television (DTV), digital video disk (DVD) players, video cassette recorder (VCR) players, compact disk (CD) players, set-top boxes (STBs), stereo receivers, audio/video receivers (AVRs), media centers, personal video recorders (PVRs), digital video recorders (DVRs), gaming devices, digital camcorders, digital cameras, blackberries, cellular phones, personal digital assistants (PDAs), mobile internet devices (MIDs), digital picture frames, and so forth. The connected media device may also be adapted to receive content from multiple inputs representing Internet Protocol (IP) input connections, person-to-person (P2P) input connections, cable/satellite/broadcast input connections, DVB-H and DMB-T transceiver connections, ATSC and cable television tuners, UMTS and WiMAX MBMS/MBS, IPTV through DSL or Ethernet connections, WiMax and Wifi connections, Ethernet connections, and so forth.

As mentioned above, the sharing of content between the various connected devices is often necessary to provide the entertainment and/or interactive social experiences. But, the transferring of content between the different connected media devices is not currently an intuitive process. For example, a user may select among a number of connected devices in some symbolic list of "currently available" devices to transfer content to and from each of the devices. But, the construction of this list and the graphical user interface (GUI) representation is conceptually abstract in a home environment. As the number of connected devices grows in a home, it is a challenge to represent them all in a GUI that is intuitive and requires little or no training and set-up.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Various embodiments may be generally directed to the intuitive data transfer between connected devices. In embodiments, intuitive techniques of sharing or transferring content between connected devices via dynamic collaboration user interfaces are described.

In embodiments, a connected media center device or appliance ("MCA") stores or has access to content that a user wants to transfer to a destination device. In embodiments, the MCA is adapted to interact with a mobile device in such a way that when the two are within certain proximity of each other, the mobile device is able to act as a remote control for the MCA. Likewise, when the destination device and the mobile device are within certain proximity of each other, the mobile device is able to act as a remote control for the destination device. Once the MCA/destination device and the mobile device are connected (and within certain proximity), they exchange information that is used to develop a dynamic collaboration user interface between the two. Via dynamic collaboration user interfaces, embodiments of the invention may provide more intuitive user interfaces to a user for the transfer of content between the various devices to enhance entertainment and/or interactive social experiences, for example.

State information regarding where the user is in the transfer process may also be provided via the collaboration user interfaces and visual cues to the user. Examples of the state information may include visual indications of when two devices are within close proximity to each other and when a collaboration user interface between the two is active. Other examples may include iconic representations of content of interest and indicating when a device has access to the content of interest, and so forth. Embodiments of the invention are not limited in this context. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
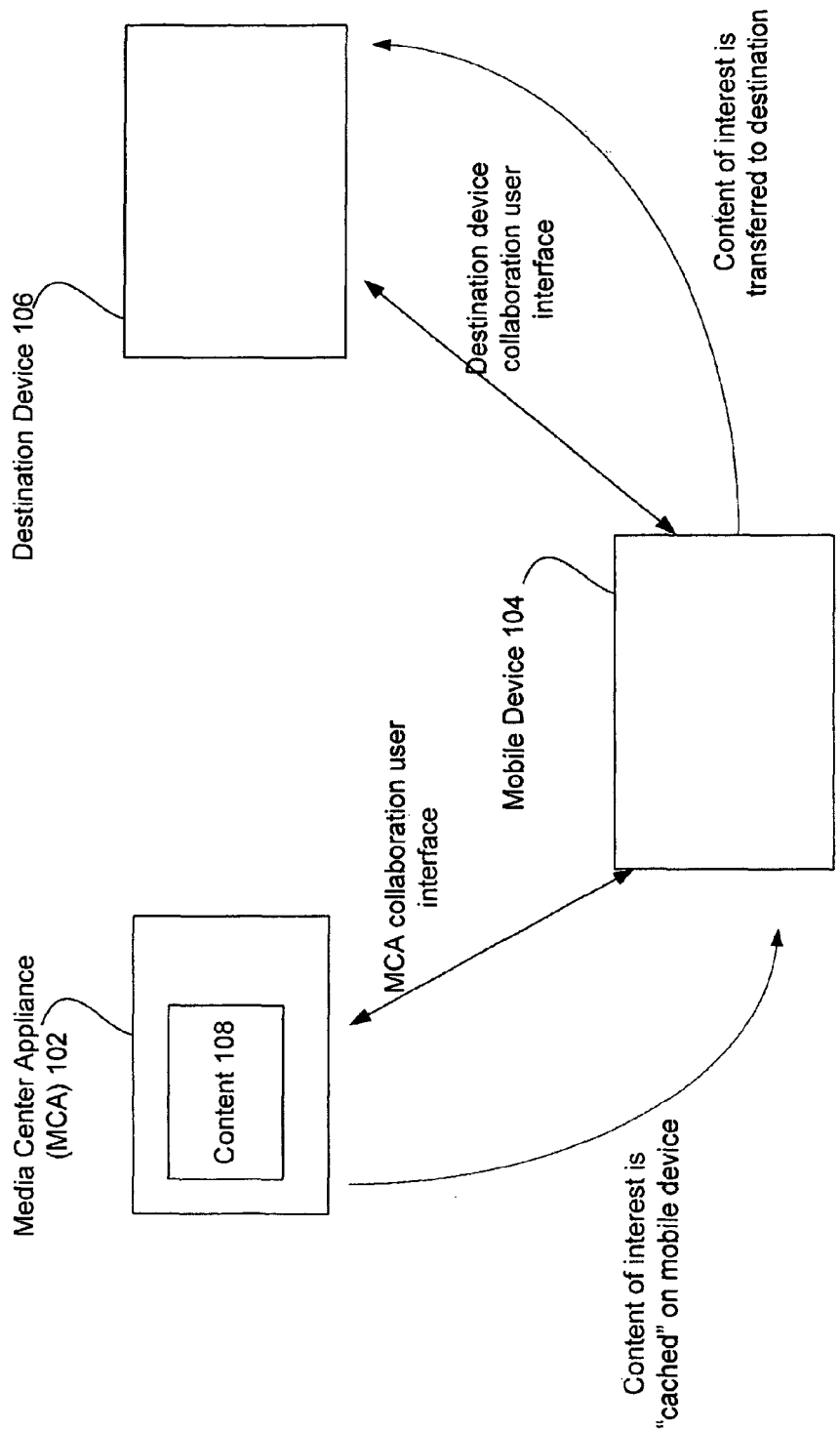
FIG. 1 illustrates an embodiment of a system.

FIG. 1 illustrates an embodiment of a system 100. Referring to FIG. 1, system 100 may comprise a media center appliance (MCA) 102, a mobile device 104, and a destination device 106. As mentioned above and in an embodiment, MCA 102 stores or has access to content 108 that a user wants to transfer to destination device 106.

In embodiments, MCA 102 is adapted to interact with mobile device 104 in such a way that when the two are within certain proximity of each other, a dynamic MCA collaboration user interface is created between the two. The MCA collaboration user interface enables mobile device 104 to act as a remote control for MCA 102. Likewise, when destination device 106 and mobile device 104 are within certain proximity of each other, a dynamic collaboration interface is created between the two. The destination device collaboration user interface enables mobile device 104 to act as a remote control for destination device 106. Via the dynamic collaboration user interfaces, embodiments of the invention may provide more intuitive user interfaces to facilitate entertainment and/or interactive social experiences. As described herein, embodiments of the invention provide more intuitive ways for a user to transfer content of interest between devices. Embodiments of the invention are not limited to the transfer of content and may be used for any manipulation of content between devices.

As shown in FIG. 1, once the MCA collaboration user interface is created, the content of interest may be "cached" or made available to mobile device 104. Once the destination device collaboration user interface is created, the content of interest may be transferred to destination device 106. State information regarding where the user is in the transfer process may also be provided via the collaboration user interfaces, as will be described in more detail below with FIG. 2. Embodiments of how the collaborative user interfaces may be implemented are described in more detail below with reference to FIGS. 3-7.

Although there are only three devices illustrated in FIG. 1, this is not meant to limit embodiments of the invention. In fact, embodiments of the invention contemplate any number of devices. Each of these elements is described next in more detail.

In embodiments, MCA 102 may be any connected device capable of performing the functionality of the invention described herein. In embodiments, MCA 102 stores or has access to content 108 that a user wants to transfer to destination device 106 (or manipulate in some other manner). Examples of MCA 102 may include, but are not limited to, a connected high-definition television (HDTV), a universally connected display (UCD) which may be a connected audio/video (AV) device integrated in a digital television (DTV), a connected advanced set-top box (STB), and so forth. MCA 102 may be owned, borrowed or licensed by its respective user.

In embodiments, MCA 102 is adapted to receive multiple inputs supporting different sources of media or content. The multiple inputs may represent various types of connections including wired, wireless, infra-red, or some combination thereof. More specifically, the multiple inputs may represent Internet Protocol (IP) input connections, a peer-to-peer (P2P) input connection, broadcast/satellite/cable input connections, DVB-H and DMB-T transceiver connections, ATSC and cable television tuners, UMTS and WiMAX MBMS/MBS, IPTV through DSL or Ethernet connections, WiMax and Wifi connections, Ethernet connections, and inputs from various electronic devices. Example electronic devices may include, but are not limited to, televisions, DVD players, VCR players, CD or music players, STBs, stereo receivers, AVRs, media centers, PVRs, DVRs, gaming devices, digital camcorders, digital cameras, blackberries, cellular phones, PDAs, laptops, flash devices, MIDs, ultra-mobile PCs, MP3 players, and so forth. Embodiments of the invention are not limited in this context.

In embodiments, the content may be any type of content or data. Examples of content may generally include any data or signals representing information meant for a user, such as media information, voice information, video information, audio information, image information, textual information, numerical information, alphanumeric symbols, graphics, and so forth. Although embodiments of the invention are described herein as being applicable to home entertainment, interactive social, or media related environments, this is not meant to limit the invention. In fact, embodiments of the invention are applicable to many environments including, but not limited to, office environments, healthcare environments, educational environments, research environments, and so forth. The embodiments are not limited in this context.

In embodiments, MCA 102 may represent a device that includes one or more applications. Example applications may include speech recognition applications, searching applications, graphical user interface (GUI) applications, user identification applications, and so forth. Embodiments of the invention are not limited in this context.

Referring again to FIG. 1 and in embodiments, mobile device 104 may be any mobile or personal device capable of performing the functionality of the invention described herein. Device 104 may be implemented as part of a wired communication system, a wireless communication system, an infra-red system, or a combination thereof. In one embodiment, for example, device 104 may be implemented as a mobile computing device having wireless or infra-red capabilities. A mobile computing device may refer to any device which can be easily moved from place to place. In embodiments, the mobile computing device may include a processing system.

In embodiments, device 104 may include any mobile device that is adapted to include the functionality of the present invention, including but not necessarily limited to, a mobile internet device (MID), smart phone, handheld computer, palmtop computer, personal digital assistant (PDA), cellular telephone, combination cellular telephone/PDA, pager, one-way pager, two-way pager, messaging device, data communication device, MP3 player, laptop, ultra-mobile PC, smart universal remote control, and so forth.

In embodiments, mobile device 104 may represent a device that includes user input features or interaction options such as, but not limited to, a microphone, touch screen or pad, gyroscope, accelerometer, keyboard, biometric data readers, screen size, types of media or content information stored and/or supported, and so forth. One or more of the interaction options may include haptic technology. In general, haptic technology refers to technology which interfaces to the user via the sense of touch by applying forces, vibrations and/or motions to the user.

In embodiments, when mobile device 104 is acting as a remote control for MCA 102 or device 106 via the collaboration user interface, it may also act as a remote control for other devices in its environment. In embodiments, two or more mobile devices 104 may participate at once to create a collaboration user interface with MCA 102 or device 106. For example, if a second mobile device were to be within certain proximity with MCA 102, it would be possible to have two people interacting collaboratively with the same MCA 102.

Destination device 106 of FIG. 1 may be any connected device capable of performing the functionality of the invention described herein. In embodiments, destination device 106 is capable of having content 108 transferred to it via mobile device 104, for example. Examples of destination device 106 may include, but are not limited to, a PC, a UCD, a DVD player, a VCR player, a CD player, a STB, a stereo receiver, an AVR, a media center, a PVR, a DVR, a gaming device, a digital camcorder, a digital camera, a blackberry, a cellular phone, a PDA, a MID, a digital picture frame, and so forth. Embodiments of the operation of the intuitive user interface is described next with reference to FIG. 2.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 2:
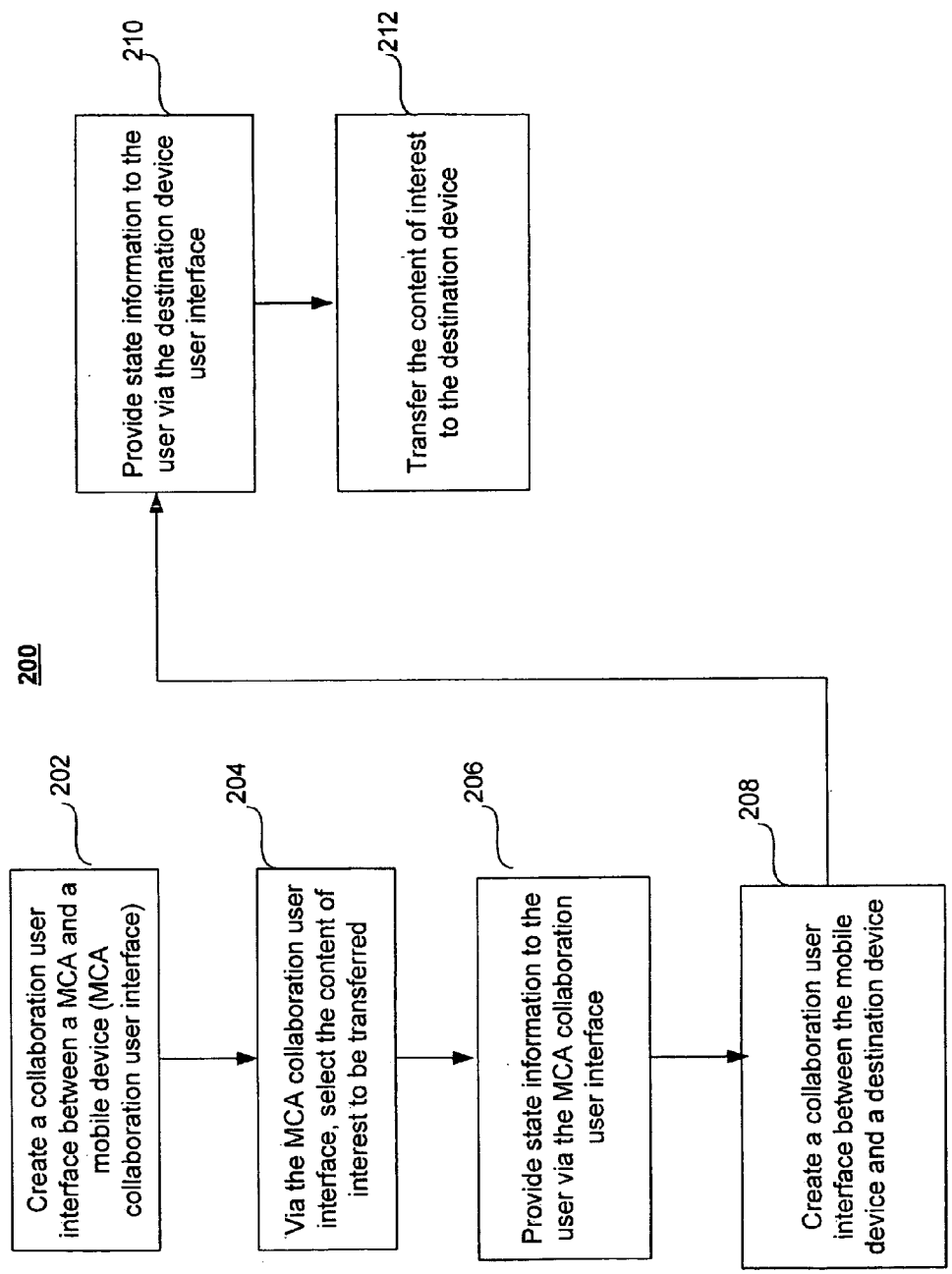
FIG. 2 illustrates an embodiment of a logic flow.

FIG. 2 illustrates one embodiment of a logic flow 200. As shown in logic flow 200, a collaboration user interface is dynamically created between a MCA (such as MCA 102 of FIG. 1) and a mobile device (such as mobile device 104 of FIG. 1) when the two come in close proximity with each other (block 202). The MCA collaboration user interface may be used to allow the mobile device to act as a remote control for the MCA and to have access to content available via the MCA. Embodiments of the collaboration user interface are described below with reference to FIGS. 3-7.

Using the MCA collaboration user interface, a user may use the mobile device to select content of interest to be transferred to another device (such as destination device 106 from FIG. 1) (block 204). In an embodiment, the selection process may be performed with the combination of the MCA's cursor and by pressing a virtual (drawn) button on the touch screen of the mobile device. Embodiments are not limited in this context.

In various states of the transfer process, the MCA collaboration user interface may provide state information back to the user via visual cues (block 206). One benefit of providing state information to the user is to keep the user informed on where in the transfer process he or she is currently. For example, the selected content of interest may be highlighted on the graphical user interface of the MCA and the selected content may be displayed on the mobile device's graphical user interface as small iconic representations (e.g., photo thumbnails). This indicates to the user that a collaboration user interface has been created between the MCA and the mobile device (e.g., the mobile device's touch screen has become an extension of the MCA's display/graphical user interface (GUI)). In an example embodiment, pressing down the thumb on the touch screen of the mobile device results in the selection of the content of interest. Here, at least conceptually, the content of interest now exists in both the MCA and the mobile device. In embodiments, the content of interest may be made available to the mobile device or may actually be stored on the mobile device. Embodiments of the invention are not limited in this context.

In embodiments, the user may perform any number of actions with the content of interest. In one example not meant to limit the invention, the user may desire to move or transfer the content of interest to the destination device. Here, in embodiments, as long as the user's thumb is "holding" the content of interest, the content of interest remains in the mobile device's control (e.g., the mobile device has access to the content of interest). As the user approaches the destination device with the mobile device and comes within close proximity to the destination device, a collaboration user interface is created for the destination device and the mobile device (block 208). The destination device collaboration user interface provides state information to the user (block 210). For example, an icon of the destination device may be displayed on the GUI of the mobile device and an icon of the mobile device may be displayed on the GUI of the destination device. This signals to the user that the mobile device and destination device are near and are able to work together via the created collaboration user interface. It is important to note that, technically speaking, the user may not be required to physically walk to the destination device with the mobile device in order to transfer the content of interest. However, the act of physically moving content around is a natural human activity and one benefit of embodiments of the invention is the mapping of the transfer of content between devices into natural actions. Here, these natural actions are more easily understood and more intuitive by the average human. Embodiments are not limited in this context.

The user may then transfer the content of interest to the destination device (block 212). For example, the user may "release" the content of interest by dragging the content of interest icon to the destination device icon now appearing on the display/GUI of the mobile device. This act conceptually moves or transfers the content of interest from the mobile device to the destination device. In embodiments, the content of interest may be actually stored on the destination device or access to the content of interest (stored at another location) may be granted to the destination device. Embodiments are not limited in this context.

As described above and in an embodiment, the selection process may be performed with the combination of the MCA's cursor and by pressing a virtual (drawn) button on the touch screen of the mobile device. The user may then transfer or "release" the content of interest by dragging the content of interest icon to the destination device icon appearing on the GUI of the mobile device. In another embodiment, the user may select a number of media files (content of interest) and drop them to a collection or staging area represented as a shelf or basket on the mobile device. In embodiments, the self or basket may be similar to a PC clip board. The user may then transfer the media files to the destination device by retrieving them from the staging area and transferring them to the destination device. Embodiments are not limited in this context.

As described above and in an embodiment, the creation/activation of a collaboration user interface between two devices may be indicated to the user as a MCA icon being displayed on the mobile device GUI and a mobile device icon being displayed on the MCA display/GUI. In another embodiment, the creation/activation of a collaboration user interface between two devices may be indicated to the user via the GUI screens of each device becoming extensions of the other on its edge boundaries. Here, for example, the top of the mobile device GUI may appear to be "connected" (by means of a visual cue such as a strip of color and an icon or text label) to the bottom edge of the MCA GUI. Alternatively, the MCA GUI may appear to be "connected" to the MCA GUI via the same sort of visual cue. Embodiments are not limited in this context.

In embodiments, the mobile device may be viewed as a holding vessel or temporary storage device for media or content transfer. Technically, the mobile device may be viewed as an aggressive caching device that automatically begins transfer of the content as soon as possible. For example, in embodiments, the content is held in a holding state on the mobile device on the assumption that is will soon be moved off of the mobile device. Accordingly, the content may be purged from the mobile device once transferred. Embodiments are not limited in this context.

In embodiments, the transfer of the content to and from the mobile device is done in the most efficient manner. For example, when the content is actually transferred to the destination device, this transfer may in reality be done either from the MCA to the destination device or from the mobile device to the destination device. Also, the most efficient connection may be determined and used (e.g., local area network (LAN) or personal area network (PAN) connection). In embodiments, the above is decided at the moment of final transfer based on what is determined to be most expedient. For example, the actual transfer of content may occur over a LAN via a number of different available protocols including digital living network alliance (DLNA) or simpler digital transmission content protection over Internet protocol (DTCP-IP) exchanges may be used. Accordingly, the best connection and protocol may be determined and used by embodiments of the invention for transfer of the content. Embodiments are not limited in this context.

Even when the most efficient connection and protocol are used for the transfer of the content, the actual transfer may take a period of time depending on the media file size and connection/protocol used. In embodiments, during this transfer of content an indication to the user is provided that the content is being moved. For example, the transfer may be represented as an animation of the content icons via color changes, graying of the color, flashing of the icon, and so forth. When the transfer is finished, the content icon may return to full color and is no longer animated, for example.

As described above and in embodiments, the selected content of interest may be highlighted on the graphical user interface of the MCA and the selected content may be displayed on the mobile device's graphical user interface as small iconic representations (e.g., photo thumbnails). When the content of interest is a group of pictures, for example, the content of interest may be represented as a "pile of pictures" with some bits and pieces of the photos showing to remind the user what this particular stack of pictures represents. When the content of interest is actually selected and held by a user's finger, and represented on the mobile device touch screen, it may be visible outside of the boundary of the contact area of the finger on the touch screen. This allows the user to be able to visually confirm the current state of the content as being selected. This example is not meant to limit the invention.

As described above, the user may not be technically required to physically walk to the destination device with the mobile device in order to transfer the content of interest. However, the act of physically moving content around is a natural human activity. One benefit of embodiments of the invention is the mapping of the transfer of content between connected or networked devices into natural actions. Here, these natural actions are more easily understood and more intuitive by the average human. It should be noted that a more advanced user may not be inhibited to use a short-cut to transfer content. Here, the entire home with all the current devices may be represented by a "house" icon on the mobile device or MCA, for example. The user when activating this icon or widget may then have the full selection of devices available and be able to select the destination device by symbol and name (e.g. kitchen picture frame) and move content to this device without physically moving and being in close proximity. A protocol such as DLNA may discover all the devices dynamically and keep the list updated and relevant. The home icon may also appear only when the mobile device is in the home, which is another dynamic representation of close proximity. Embodiments are not limited in this context.

FIGS. 3-7 describe embodiments of the creation of collaboration user interfaces between two devices. Although FIGS. 3-7 describe the collaboration user interface as being created between a MCA and a mobile device, this is not meant to limit the invention. The collaboration user interface may be created between any two devices that contain the required functionality.

Figure 3:
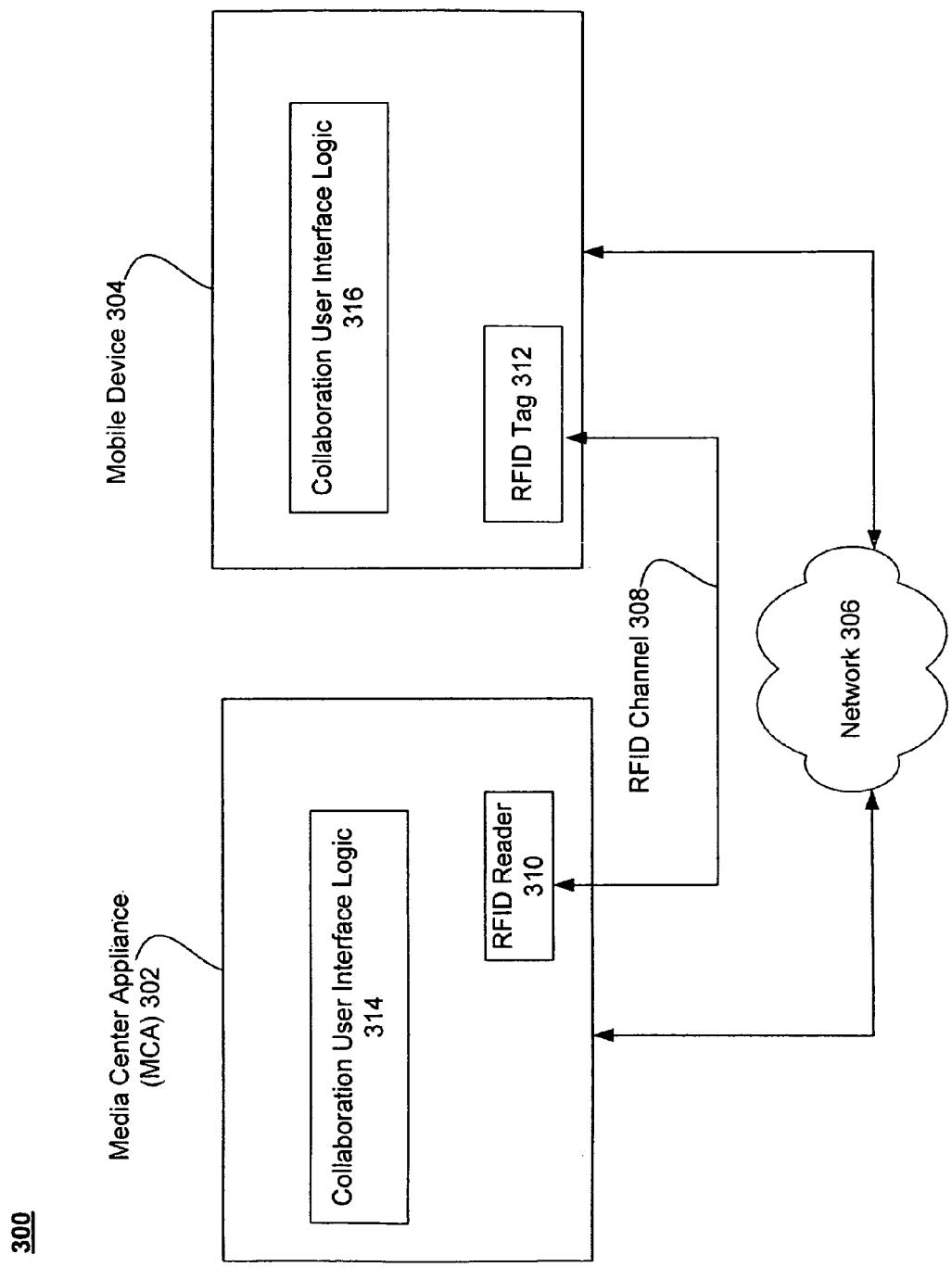
FIG. 3 illustrates an embodiment of a system.

Referring to FIG. 3, FIG. 3 illustrates an embodiment of a system 300. System 300 may comprise a media center appliance (MCA) 302, a mobile device 304, a network 306 and a radio frequency identification (RFID) channel 308. MCA 302 may include a RFID reader 310 and collaboration user interface logic 314. Mobile device 304 may include a RFID tag 312 and collaboration user interface logic 316. Although only one MCA and one mobile device are shown in FIG. 3, this is not meant to limit embodiments of the invention. In fact, embodiments of the invention contemplate any number of MCAs and/or mobile devices. Each of these elements is described next in more detail.

In embodiments, MCA 302 may be any connected device capable of performing the functionality of the invention described herein (such as MCA 102 or destination device 106 from FIG. 1). Mobile device 304 may be any mobile or personal device capable of performing the functionality of the invention described herein (such as mobile device 104 from FIG. 1).

Network 306 of FIG. 3 facilitates communication between MCA 302 and mobile device 304. Network 306 may be a LAN, a PAN, high speed Internet network, or any other type of network suited for the particular application. Network 306 may be wireless, infra-red, wired, or some combination thereof. Other types of networks may be added or substituted as new networks are developed.

RFID channel 308 allows for communication between RFID tag 312 in mobile device 304 and RFID reader 310 in MCA 302. RFID technology allows for the means to determine the rough proximity between MCA 302 and mobile device 304. RFID technology also facilitates MCA 302 to uniquely identify mobile device 304. Embodiments of the invention are not limited to RFID technology and contemplate the use of any technology that allows for the determination of the rough proximity and/or identification between two or more devices including, for example, Bluetooth technology.

In embodiments, once mobile device 304 is uniquely identified by MCA 302 (via, for example, RFID technology), MCA 302 and device 304 exchange user interface capability information with each other. In other embodiments, only device 304 sends user interface capability information to MCA 302. For example, MCA 302 may provide device 304 with the various applications it supports, the types of media or content information stored and/or supported, etc. As described above, example applications may include speech recognition applications, searching applications, graphical user interface (GUI) applications, identification applications, and so forth. In exchange, device 304 may provide MCA 302 with the various input features or interaction options it includes that might be useful to a user interface for MCA 302. As mentioned above, such interaction options may include a microphone, touch screen, gyroscope, keyboard, biometric data readers, screen size, types of media or content information stored and/or supported, etc. In embodiments, this information is exchanged via network 306.

In embodiments, collaboration user interface logic 314 of MCA 302 uses the provided interaction options of device 304 to create a MCA application or widget that includes counterpart user interface components for a collaboration user interface. The counterpart user interface components may include mobile device user interface components and MCA user interface components. The collaborative user interface is one between MCA 302 and mobile device 304.

In embodiments, MCA 302 transfers the MCA application or widget with the mobile device counterpart user interface components to mobile device 304 via collaboration user interface logic 316. Once downloaded to mobile device 304, the MCA application or widget appears as an icon on the mobile device user interface when the two are within a certain proximity to each other. Similarly, a mobile device icon may be displayed on the user interface of MCA 302 to indicate to a user that the two are connected and facilitate a collaboration user interface. In embodiments, when the MCA icon is activated, mobile device 304 acts as a remote control device for MCA 302 by having the mobile device user interface components interact with their counterpart MCA user interface components.

As described above and in embodiments, the collaboration user interface allows the input features or interaction options or capabilities found on mobile device 304 to be used for one or more user interfaces or applications on MCA 302. For example, MCA 302 may have a speech recognition application but no microphone for a user to enter voice data. Mobile device 304 may have a microphone. In embodiments, the collaboration user interface may facilitate the microphone on mobile device 304 to be used to enter voice data into the speech recognition application of MCA 302. In another example, MCA 302 may require a free-form pointing system to select among a number of options on a GUI displayed on a screen (e.g., to select an item like a television show or movie). Here, the collaboration user interface may facilitate a gyroscope or accelerometer of mobile device 304 to act as a gesture input device to MCA 302. In another example, MCA 302 may have a search box that needs to be filled in to search for content accessible via MCA 302. The collaboration user interface may enable the touch screen of mobile device 304 to act as a remote keyboard to MCA 302. In yet another example, the microphone of mobile device 304 may be used to send voice data to MCA 302 for automatic speech recognition as the input to the search. Embodiments of the invention are not limited to these examples.

In embodiments, mobile device 304 is personal to a user (i.e., not typically shared with another user). A personal mobile device is likely to store content and customizations that were created by its user. In embodiments, MCA 302 is able to uniquely identify mobile device 304 via, for example, its RFID tag 312. When mobile device 304 is personal to a user and is able to be uniquely identified by MCA 302, then MCA 302 may be able to uniquely identify the user of mobile device 304 and thus the user currently interacting with it via mobile device 304. Accordingly, mobile device 304 and MCA 302 are able to exchange personal information about a particular user.

The exchange of personal information about a particular user is useful for many reasons. For example, any recent user specific information such as play-lists or other entertainment preferences or customizations which are stored on mobile device 304 may be transferred to MCA 302. MCA 302 may use this information to update the user's profile, to provide more customized user interface options for the user, and so forth. In embodiments, the mobile device and MCA icons described above may be used to easily transfer files between MCA 302 and mobile device 304, as described above. Embodiments of the invention are not limited in this context.

Embodiments of the invention provide for many advantages over what currently exist today. People, in general, expect or desire things to work together in an intuitive way when it comes to devices connected together on a network. This is generally not an easy thing to accomplish, considering that every device on the network likely has its own remote control and user interface. Several aspects of the invention described above facilitate devices to more easily or intuitively work together in a networked environment. One aspect is the ability for two or more devices to be aware of each based on physical proximity. Once near each other, the devices are able to share attributes or capabilities particular to each device and use the shared capabilities to optimize a collaboration user interface between the devices. The collaboration user interface is a relevant user interface between the devices because the collaboration user interface is dynamically created between the two devices based on each device's current capabilities. Another advantage of embodiments of the invention allows the GUI of each device to remain uncluttered until the devices are within a certain proximity to each other.

As described above, the collaboration user interface is a relevant user interface between the devices. The dynamic nature of the collaboration user interface allows for updates and new features of each device to easily ripple through the collaboration user interface. For example, if the mobile device was upgraded to include a gyroscope or accelerometer, the MCA will become aware of the upgrade the next time the two devices are within a certain proximity and exchange capabilities to create the collaboration user interface. Another example may include if the MCA is upgraded to include speech recognition software. Here, in embodiments, the collaboration user interface will check all devices within certain proximity for the needed input, such as a microphone.

Another advantage of embodiments of the invention is that the collaboration user interface becomes more familiar and consistent in the environment it is used. For example, when the keyboard is presented locally on the mobile device, it may be created on the MCA with the MCA's colors, behavior and styles. The GUI on the MCA (or television screen, for example) may use the same colors, behavior and styles as the one sent to the mobile device. The mobile device, then part of the MCA, becomes an extension of the user interface of the MCA allowing the user to once learn how the MCA works and no matter what mobile device pairs up with it via a collaboration user interface, the look, feel and behavior are maintained.

In various embodiments, system 300 of FIG. 3 may be implemented as a wireless system, a wired system, an infrared system, or some combination thereof. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Figure 4:
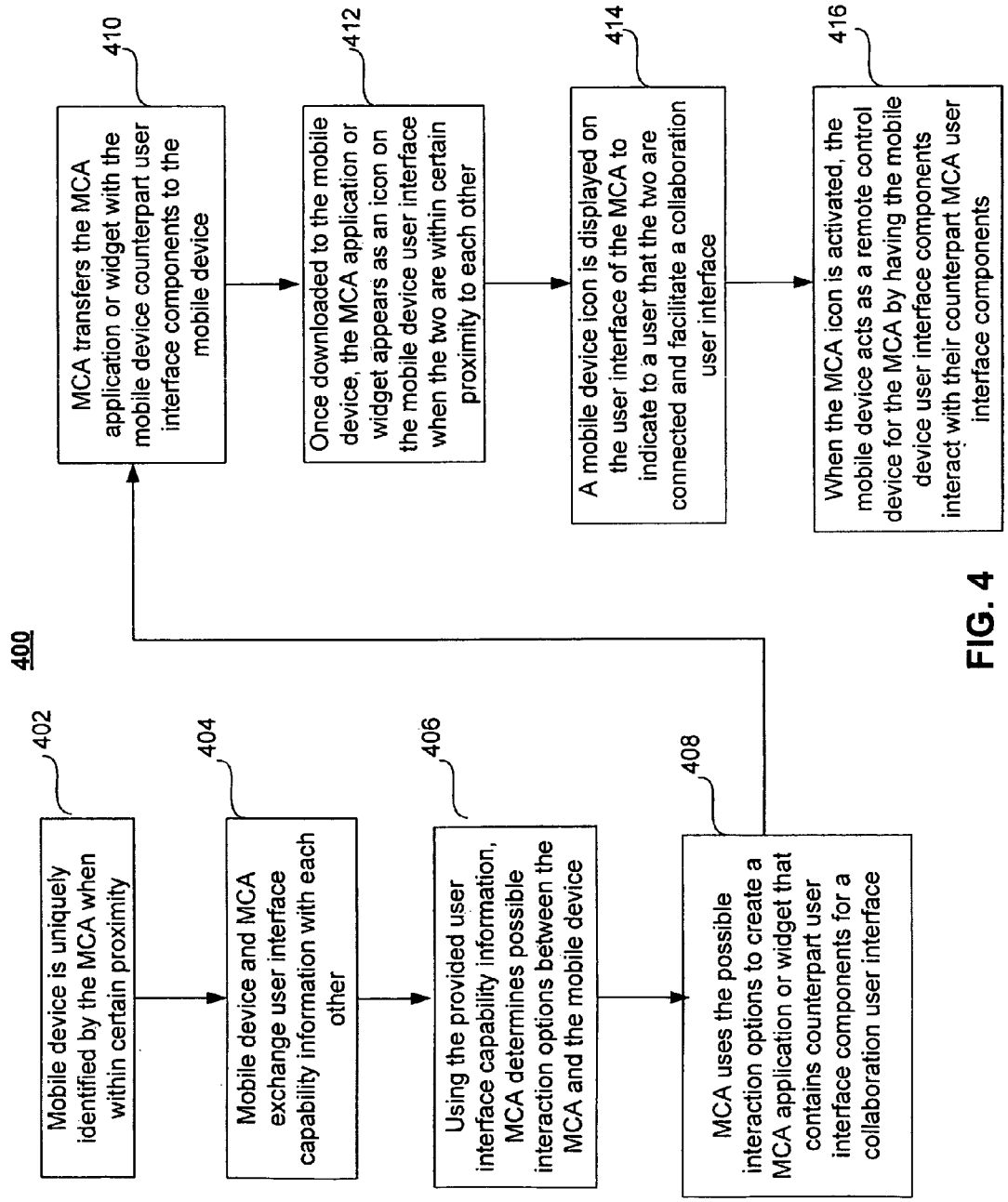
FIG. 4 illustrates an embodiment of a logic flow.

FIG. 4 illustrates one embodiment of a logic flow 400. As shown in logic flow 400, a mobile device (such as mobile device 304 from FIG. 3) is uniquely identified by a MCA (such as MCA 302 from FIG. 3) when the two are within certain proximity of each other (block 402). As described above and in an embodiment, RFID technology (such as RFID channel 308, RFID reader 310 and RFID tag 312 from FIG. 3) allows for determination of the rough proximity between the MCA and mobile device. RFID technology may also allow the MCA to uniquely identify the mobile device.

Figure 5:
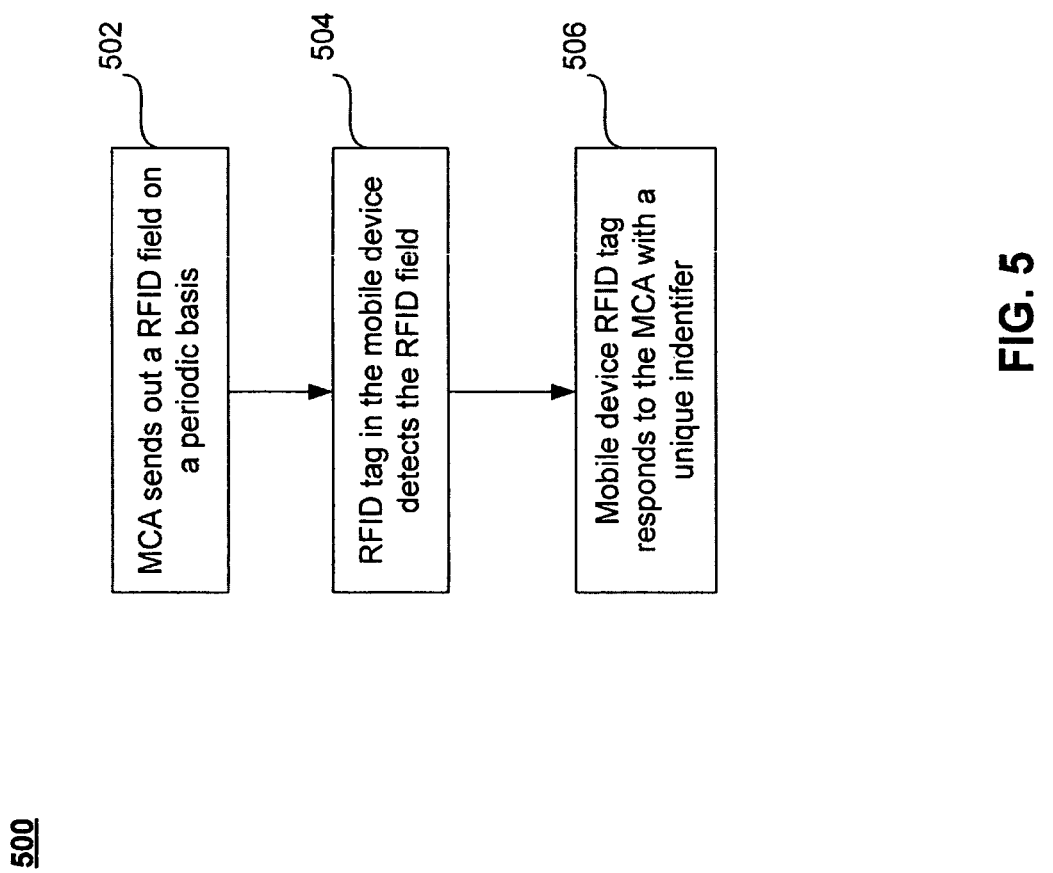
FIG. 5 illustrates an embodiment of a logic flow.

FIG. 5 illustrates an embodiment of a logic flow 500 of determining certain proximity and identification of devices. Referring to FIG. 5, the MCA sends out a RFID field on a periodic basis (block 502). The RFID tag in the mobile device detects the RFID field (block 504). The RFID tag responds to the MCA with a unique identifier (block 506).

Embodiments of the invention are not limited to RFID technology and contemplate the use of any technology that allows for the determination of the rough proximity and/or identification between two or more devices.

Figure 6:
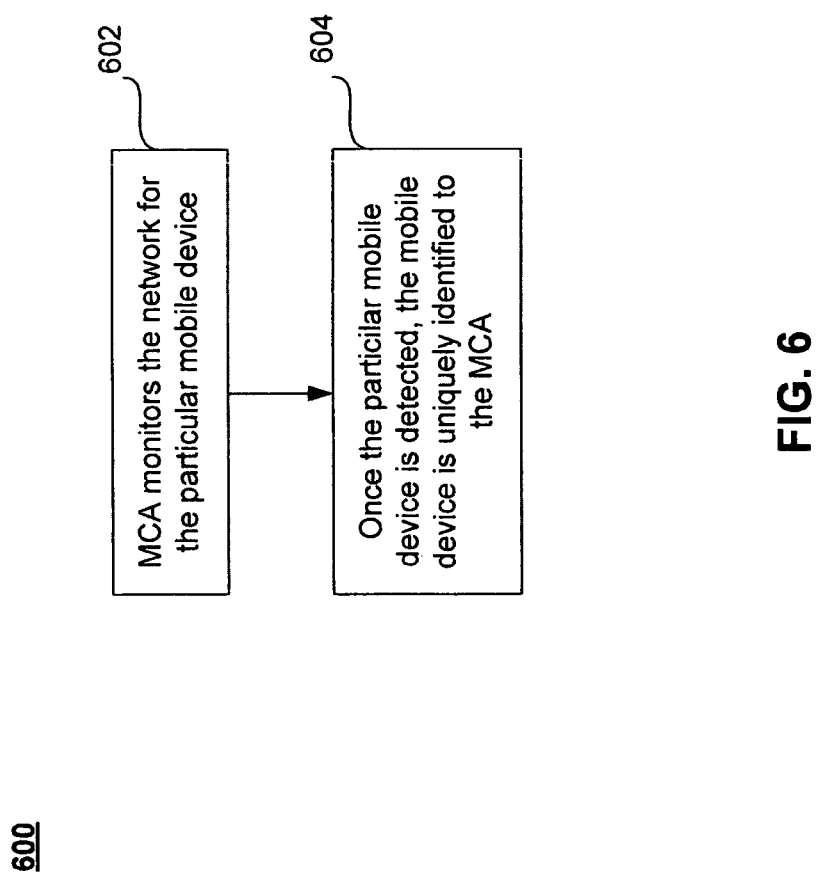
FIG. 6 illustrates an embodiment of a logic flow.

FIG. 6 illustrates another embodiment of a logic flow 600 of determining certain proximity and identification of devices. Referring to FIG. 6, the MCA monitors the network for the particular mobile device (block 602). Once the particular mobile device is detected, the mobile device is uniquely identified to the MCA (block 604). In embodiments, the MCA may wake up the mobile device from a lower power conserving state and cause the mobile device to turn on its wireless LAN network adapter, for example.

Referring again to FIG. 4 and as described above, the mobile device and MCA exchange user interface capability information with each other (block 404). In other embodiments, only the mobile device sends user interface capability information to the MCA. Using the provided user interface capability information, the MCA determines possible interaction options between the MCA and the mobile device, as described above (block 406).

The MCA uses the possible interaction options to create a MCA application or widget that contains counterpart user interface components for a collaboration user interface, as described above (block 408). The MCA then transfers the MCA application or widget with the mobile device counterpart user interface components to the mobile device (block 410).

Once downloaded to the mobile device, the MCA application or widget appears as an icon on the mobile device user interface when the two devices are within certain proximity to each other (block 412). A mobile device icon is displayed on the user interface of the MCA to indicate to a user that the two devices are connected and facilitate a collaboration user interface (block 414).

When the MCA icon is activated, the mobile device acts as a remote control device for the MCA by having the mobile device user interface components interact with their counterpart MCA user interface components (block 416).

Figure 7:
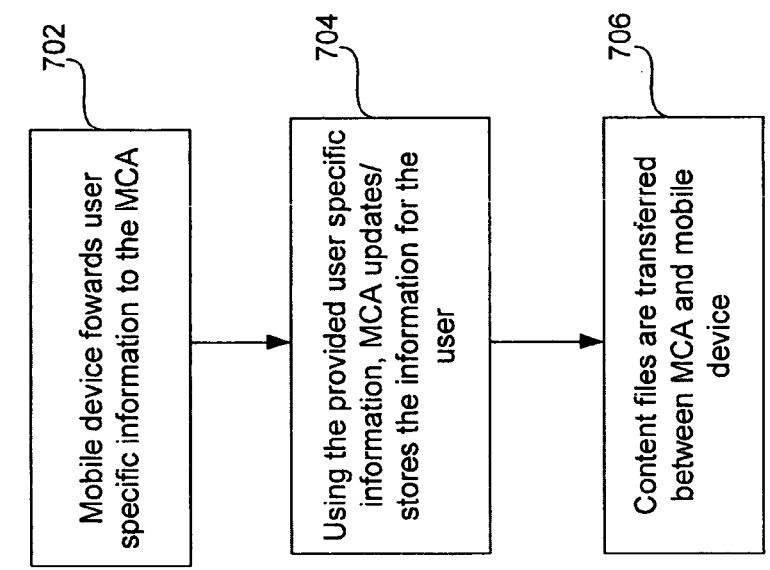
FIG. 7 illustrates an embodiment of a logic flow.

FIG. 7 illustrates an embodiment of a logic flow 700. Referring to FIG. 7, the mobile device forwards user specific information to the MCA, as described above (block 702). Using the provided user specific information, the MCA updates/stores the information for the user (block 704). Content files may be transferred between the MCA and mobile device via a drag and drop action on the relevant icons, as described above (block 706).

Figure 8:
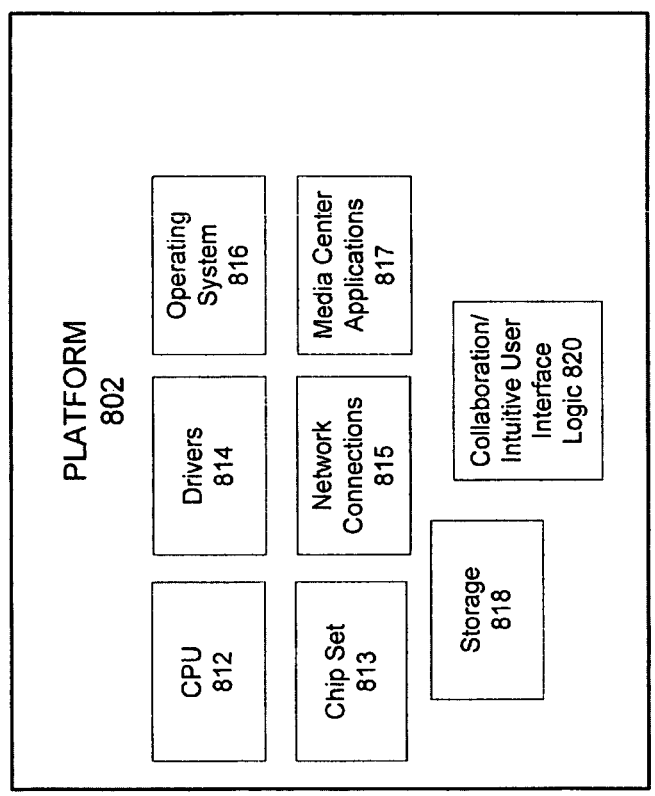
FIG. 8 illustrates an embodiment of a system.

FIG. 8 illustrates an embodiment of a platform 802 in which functionality of the present invention as described herein may be implemented. In one embodiment, platform 802 may comprise or may be implemented as a media platform 802 such as the Viiv™ media platform made by Intel® Corporation. In one embodiment, platform 802 may accept multiple inputs, as described above.

In one embodiment, platform 802 may comprise a CPU 812, a chip set 813, one or more drivers 814, one or more network connections 815, an operating system 816, and/or one or more media center applications 817 comprising one or more software applications, for example. Platform 802 also may comprise storage 818, and collaboration user interface logic 820.

In one embodiment, CPU 812 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 813 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 814 may comprise the Quick Resume Technology Drivers made by Intel® to enable users to instantly turn on and off platform 802 like a television with the touch of a button after initial boot-up, when enabled, for example. In addition, chip set 813 may comprise hardware and/or software support for 5.1 surround sound audio and/or high definition 7.1 surround sound audio, for example. Drivers 814 may include a graphics driver for integrated graphics platforms. In one embodiment, the graphics driver may comprise a peripheral component interconnect (PCI) Express graphics card.

In one embodiment, network connections 815 may comprise the PRO/1000 PM or PRO/100 VE/VM network connection, both made by Intel® Corporation.

In one embodiment, operating system 816 may comprise the Windows® XP Media Center made by Microsoft® Corporation. In other embodiments, operating system 816 may comprise Linux®, as well as other types of operating systems. In one embodiment, one or more media center applications 817 may comprise a media shell to enable users to interact with a remote control device from a distance of about 10-feet away from platform 802 or a display device, for example. In one embodiment, the media shell may be referred to as a "10-feet user interface," for example. In addition, one or more media center applications 817 may comprise the Quick Resume Technology made by Intel®, which allows instant on/off functionality and may allow platform 802 to stream content to media adaptors when the platform is turned "off."

In one embodiment, storage 818 may comprise the Matrix Storage technology made by Intel® to increase the storage performance enhanced protection for valuable digital media when multiple hard drives are included. In one embodiment, collaboration/intuitive user interface logic 820 is used to enable the functionality of the invention as described herein. The embodiments, however, are not limited to the elements or in the context shown or described in FIG. 8.

Platform 802 may establish one or more logical or physical channels to communicate information. The information may include media information and control information. Media information may refer to any data representing content meant for a user. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
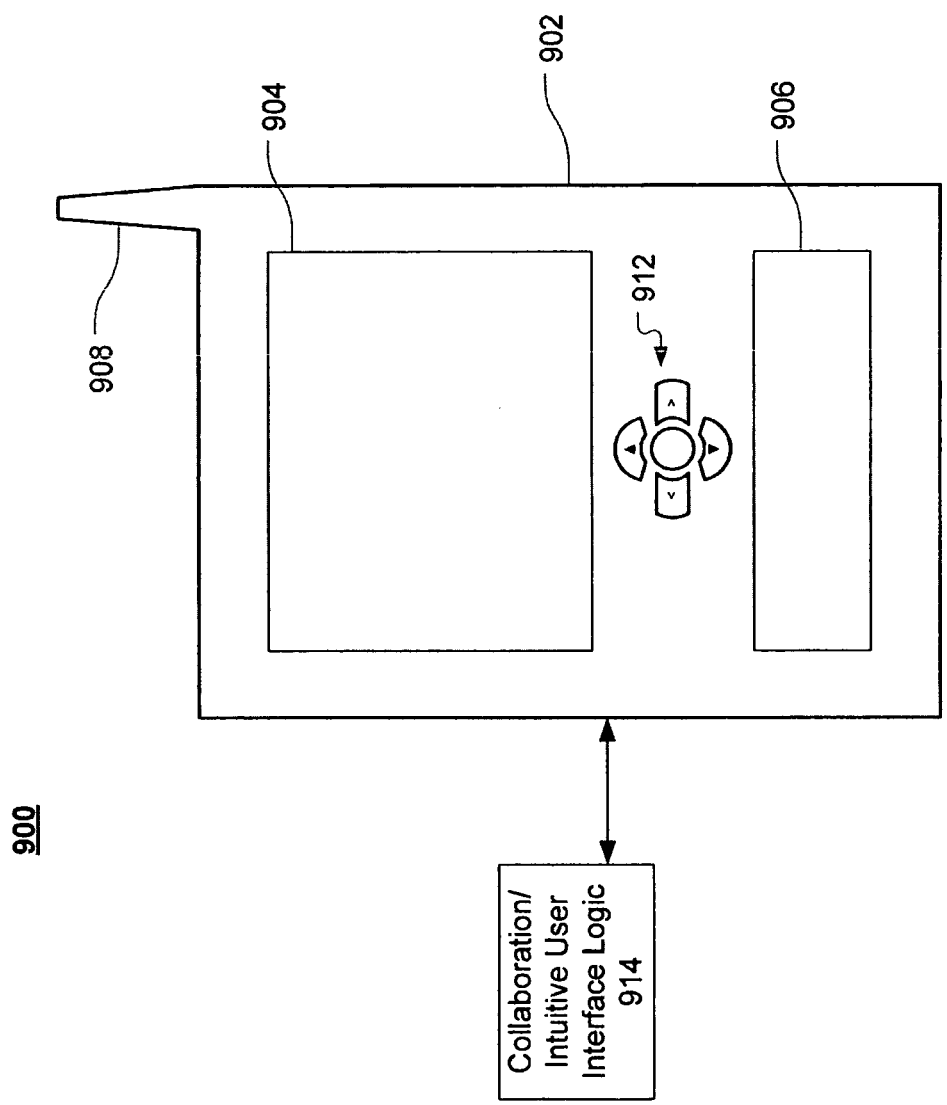
FIG. 9 illustrates an embodiment of a device.

FIG. 9 illustrates one embodiment of a device 900 in which functionality of the present invention as described herein may be implemented. In one embodiment, for example, device 900 may comprise a communication system. In various embodiments, device 900 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, MID, MP3 player, and so forth. The embodiments are not limited in this context.

In one embodiment, device 900 may be implemented as part of a wired communication system, a wireless communication system, or a combination of both. In one embodiment, for example, device 900 may be implemented as a mobile computing device having wireless capabilities. A mobile computing device may refer to any device having a processing system and a mobile power source or supply, such as one or more batteries, for example.

Examples of a mobile computing device may include a laptop computer, ultra-mobile PC, portable computer, handheld computer, palmtop computer, personal digital assistant (PDA), cellular telephone, combination cellular telephone/PDA, smart phone, pager, one-way pager, two-way pager, messaging device, data communication device, MID, MP3 player, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise a five-way navigation button 912. I/O device 906 may comprise a suitable keyboard, a microphone, and/or a speaker, for example. Display 904 may comprise any suitable display unit for displaying information appropriate for a mobile computing device. I/O device 906 may comprise any suitable I/O device for entering information into a mobile computing device. Examples for I/O device 906 may include an alphanumeric keyboard, a numeric keypad, a touch pad, input keys, buttons, switches, rocker switches, voice recognition device and software, and so forth. Information also may be entered into device 900 by way of microphone. Such information may be digitized by a voice recognition device. The embodiments are not limited in this context.

In embodiments, device 900 is adapted to include collaboration/intuitive user interface logic 914. In one embodiment, collaboration user interface logic 914 is used to enable the functionality of the invention as described herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising, a mobile device that includes a processor and memory configured to:
   communicate with a first media device over a first wireless communication channel when the mobile device is physically proximate to the first media device;
   communicate with the first media device over a network-based second wireless communication channel based on a communication between the mobile device and the first media device over the first wireless communication channel, including to receive an indication of content available to the first media device when the mobile device is physically proximate to the first media device;
   present a user-selectable indication of the content available to the first media device at the mobile device;
   permit a user of the mobile device to elect a second media device as a destination of user-selected content available to the first media device when the mobile device is proximate to the second media device;
   receive information from the first media device regarding one or more of applications supported by the first media device, types of content supported by the first media device, and content stored at the first media device;
   provide information to the first media device regarding interface components of the mobile device, wherein the interface components include one or more of a microphone, a touchscreen display, a gyroscope, a keyboard, and a biometric data reader; and
   receive an application from the first media device to permit the mobile device to interface with one or more of a user interface and an application of the first media device through one or more of the interface components of the mobile device when the mobile device is physically proximate to the first media device.

2. The apparatus of claim 1, wherein the processor and memory of the mobile device are further configured to:
   present a user-selectable icon of first content available to the first media device;
   permit the user to select the first content by placing and holding a finger of the user at the icon; and
   permit the user to elect the second media device as a destination of the first content by releasing the finger from the icon when the mobile device is physically proximate to the second media device.

3. The apparatus of claim 1, wherein the processor and memory of the mobile device are further configured to:
   display a user-selectable first icon to represent first content that is available to the first media device;
   display a second icon of the second media device when the mobile device is physically proximate to the second media device; and
   permit the user to elect the second media device as a destination of the first content by dragging the first icon to the second icon.

4. The apparatus of claim 1, further including the first media device, wherein the first media device includes a processor and memory configured to:
   determine that the mobile device is physically proximate to the first media device based on a communication from the mobile device over the first wireless communication channel; and
   provide the indication of the content available to the first media device based on a determination that the mobile device is physically proximate to the first media device.

5. The apparatus of claim 1, wherein the processor and memory of the mobile device are further configured to perform one or more of the following based on the application received from the first media device:
   provide voice data from a microphone of the mobile device as input to a speech recognition application of the first media device; and
   provide data from one or more of a gyroscope and an accelerometer of the mobile device gesture input to the first media device.

6. The apparatus of claim 1, wherein the mobile device is configured to receive the user-selected content, provide the user-selected content to the second media device over a wireless communication channel, and thereafter purge the user-selected content from the mobile device.

7. The apparatus of claim 1, wherein one or more of the mobile device and the first media device is configured to determine to provide the user- selected content to the second media device from a selectable one of the mobile device and the first media device.

8. The apparatus of claim 1, wherein one or more of the mobile device and the first media device is configured to select one or more of multiple selectable communication parameters with which to provide the user-selected content to the second media device, and wherein the multiple selectable communication parameters include one or more of multiple selectable communication networks and multiple selectable communication protocols.

9. A method, comprising:
   communicating between a mobile device and a first media device over a first wireless communication channel when the mobile device is physically proximate to the first media device;
   communicating between the mobile device and the first media device over a network-based second wireless communication channel based on a communication between the mobile device and the first media device over the first wireless communication channel, including receiving an indication of content available to the first media device when the mobile device is physically proximate to the first media device;
   presenting a user-selectable indication of the content available to the first media device at the mobile device based on the indication; and
   permitting a user of the mobile device to elect a second media device as a destination of user-selected content available to the first media device when the mobile device is proximate to the second media device
   receiving information at the mobile device from the first media device regarding one or more of applications supported by the first media device, types of content supported by the first media device, and content stored at the first media device;

providing information from the mobile to the first media device regarding interface components of the mobile device, wherein the interface components include one or more of a microphone, a touchscreen display, a gyroscope, a keyboard, and a biometric data reader; and receiving an application at the mobile device from the first media device to permit the mobile device to interface with one or more of a user interface and an application of the first media device through one or more of the interface components of the mobile device when the mobile device is physically proximate to the first media device.

10. The method of claim 9, wherein:

the presenting includes presenting a user-selectable icon of first content available to the first media device, and permitting the user to select the first content by placing and holding a finger of the user at the icon; and the permitting includes permitting the user to elect the second media device as a destination of the first content by releasing the finger from the icon when the mobile device is physically proximate to the second media device.

11. The method of claim 9, further including receiving the user-selected content at the mobile device, providing the user-selected content from the mobile device to the second media device over a wireless communication channel, and thereafter purging the user-selected content from the mobile device.

12. The method of claim 9, further including determining at one or more of the mobile device and the first media device to provide the user-selected content to the second media device from a selectable one of the mobile device and the first media device.

13. A non-transitory computer readable medium encoded with a computer program that includes instructions to cause a processor of a mobile device to:

communicate with a first media device over a first wireless communication channel when the mobile device is physically proximate to the first media device;

communicate with the first media device over a network-based second wireless communication channel based on a communication between the mobile device and the first media device over the first wireless communication channel, including to receive an indication of content available to the first media device when the mobile device is physically proximate to the first media device;

present a user-selectable indication of the content available to the first media device at the mobile device;

permit a user of the mobile device to elect a second media device as a destination of user-selected content available to the first media device when the mobile device is proximate to the second media device;

receive information from the first media device regarding one or more of applications supported by the first media device, types of content supported by the first media device, and content stored at the first media device;

provide information to the first media device regarding interface components of the mobile device, wherein the interface components include one or more of a microphone, a touchscreen display, a gyroscope, a keyboard, and a biometric data reader; and receive an application from the first media device to permit the mobile device to interface with one or more of a user interface and an application of the first media device through one or more of the interface components of the mobile device when the mobile device is physically proximate to the first media device.

14. The non-transitory computer readable medium of claim 13, further including instructions to cause the processor of the mobile device to:

present a user-selectable icon of first content available to the first media device;

permit the user to select the first content by placing and holding a finger of the user at the icon; and permit the user to elect the second media device as a destination of the first content by releasing the finger from the icon when the mobile device is physically proximate to the second media device.

15. The non-transitory computer readable medium of claim 13, further including instructions to cause one or more of the processor of the first mobile device and a processor of the first media device to:

determine that the mobile device is physically proximate to the first media device based on a communication from the mobile device over the first wireless communication channel; and provide the indication of the content available to the first media device based on a determination that the mobile device is physically proximate to the first media device.

16. The non-transitory computer readable medium of claim 13, further including instructions to cause the processor of the mobile device to store the user-selected content at the mobile device, provide the user-selected content from the mobile device to the second media device, and thereafter purge the user-selected content from the mobile device.

17. The non-transitory computer readable medium of claim 13, further including instructions to cause one or more of the processor of the mobile device and a processor of the first media device to:

determine to provide the user-selected content to the second media device from a selectable one of the mobile device and the first media device.

\* \* \* \* \*